(12) United States Patent
Xiong et al.

(10) Patent No.: US 8,851,337 B2
(45) Date of Patent: Oct. 7, 2014

(54) LIQUID CRYSTAL DROPPING DEVICE

(75) Inventors: Mei Xiong, Shenzhen (CN); Liang Xu, Shenzhen (CN)

(73) Assignee: Shenzhen China Star Optoelectronics Technology Co., Ltd, Shenzhen (CN)

( * ) Notice: Subject to any disclaimer, the term of this patent is extended or adjusted under 35 U.S.C. 154(b) by 52 days.

(21) Appl. No.: 13/634,553

(22) PCT Filed: Aug. 29, 2012

(86) PCT No.: PCT/CN2012/080681
§ 371 (c)(1),
(2), (4) Date: Sep. 13, 2012

(87) PCT Pub. No.: WO2014/029115
PCT Pub. Date: Feb. 27, 2014

(65) Prior Publication Data
US 2014/0048563 A1    Feb. 20, 2014

(30) Foreign Application Priority Data
Aug. 20, 2012    (CN) ...................... 2012 2 0413595 U

(51) Int. Cl.
*B65D 83/00*    (2006.01)
*G02F 1/13*    (2006.01)
*G02F 1/1341*    (2006.01)

(52) U.S. Cl.
CPC ...... *B65D 83/00* (2013.01); *G02F 2001/13415* (2013.01); *G02F 1/1303* (2013.01)
USPC ............................ 222/330; 222/485; 141/102

(58) Field of Classification Search
CPC ...... B65D 25/40; B65D 83/00; G02F 1/1303; G02F 2001/13415

USPC ......... 222/486, 319, 485, 566, 386, 330, 309, 222/63; 141/130, 102, 237
See application file for complete search history.

(56) References Cited

U.S. PATENT DOCUMENTS

| 5,407,102 A | * | 4/1995 | Freudinger et al. | ........... 222/309 |
| 6,039,211 A | * | 3/2000 | Slater et al. | ....................... 222/1 |
| 6,644,364 B1 | * | 11/2003 | Feygin | ........................... 141/130 |
| 6,851,460 B2 | * | 2/2005 | Tamai | ........................... 141/102 |

(Continued)

FOREIGN PATENT DOCUMENTS

CN    101510028 A    8/2009

OTHER PUBLICATIONS

International Search Report of PCT Application No. PCT/CN2012/080681.

*Primary Examiner* — Kevin P Shaver
*Assistant Examiner* — Robert Nichols, II

(57) ABSTRACT

The present disclosure provides a liquid crystal dropping device, including: a container for containing liquid crystal and being provided with at least one nozzle on an end thereof for ejecting liquid crystal from the container; a driver connected to the container for driving the liquid crystal to eject from the container; at least two dropping heads connected to the at least one nozzle; and at least one corrosion-resistant connecting pipe arranged between the at least one nozzle and the at least two dropping heads for communicating the at least one nozzle with the at least two dropping heads. The dropping device of the present disclosure is capable of shortening the time of manufacturing the liquid crystal panel, improving the efficiency of manufacturing the liquid crystal panel, and avoiding uneven arrangement of the liquid crystal.

14 Claims, 1 Drawing Sheet

(56) References Cited

U.S. PATENT DOCUMENTS

| | | | |
|---|---|---|---|
| 7,216,782 B2* | 5/2007 | Sugimura et al. | 222/260 |
| 8,284,375 B2* | 10/2012 | Yamazaki et al. | 349/187 |
| 2003/0155371 A1* | 8/2003 | Collasius et al. | 222/1 |
| 2005/0056713 A1* | 3/2005 | Tisone et al. | 239/690 |
| 2005/0139283 A1* | 6/2005 | Chiang et al. | 141/8 |
| 2006/0164589 A1* | 7/2006 | Kim et al. | 349/187 |
| 2006/0272734 A1* | 12/2006 | Kweon et al. | 141/67 |
| 2007/0290004 A1* | 12/2007 | Lee et al. | 222/330 |

\* cited by examiner

US 8,851,337 B2

LIQUID CRYSTAL DROPPING DEVICE

BACKGROUND

1. Technical Field

The present disclosure relates to LCD manufacturing technologies, and particularly, to a liquid crystal dropping device.

2. Description of Related Art

A liquid crystal panel generally includes two opposite substrates with a liquid crystal layer sealed therebetween. When light passes through the liquid crystal layer, the liquid crystal stands upright or is twisted to irregularly arranged, thereby preventing the light from passing through the liquid crystal layer smoothly and thus allowing the liquid crystal panel to execute the displaying function. In the manufacturing process, the liquid crystal can be dropped onto one of the substrates. After that, the substrate with the liquid crystal dropped thereon is bonded to the other substrate to form the liquid crystal panel.

Referring to FIG. 1, which is a schematic view of a present liquid crystal dropping device. The present dropping device includes a driver 10, a container 20, and a dropping head 30. The container 20 is configured for containing the liquid crystal. The driver 10 is configured for supplying driving force for driving the liquid crystal to eject from a nozzle of the container 20. The dropping head 30 is configured for dropping the liquid crystal droplet ejected from the nozzle onto a substrate 40. The driver 10 is connected to the container 20 and the drooping head 30 communicates with the nozzle. That is, the driver 10 is correspondingly connected to the container 20 and the container 20 is correspondingly connected to the dropping head 30. Since the driver 10 is correspondingly connected to the corresponding respective dropping head 30, therefore, when the lengthwise side of the liquid crystal panel forms a rows of dropping points and the widthwise side of the liquid crystal panel forms b columns of dropping points, the dropping head 30 is required to move a*b times to finish dropping the liquid crystal onto the liquid crystal panel. Therefore, it requires long time to manufacture the liquid crystal panel and further reduces the manufacturing efficiency. Additionally, the volume of each liquid crystal droplet dropping from the dropping head 30 may be varied, which results in the uneven arrangement of the liquid crystal.

SUMMARY

The present disclosure provides a liquid crystal dropping device for shortening the time of manufacturing the liquid crystal panel, improving efficiency of manufacturing the liquid crystal panel, and avoiding uneven arrangement of the liquid crystal panel from the dropping device.

The dropping device includes: a container for containing liquid crystal and being provided with at least one nozzle on an end thereof for ejecting liquid crystal from the container; a driver connected to the container for driving the liquid crystal to eject from the container; at least two dropping heads connected to the at least one nozzle; and at least one corrosion-resistant connecting pipe arranged between the at least one nozzle and the at least two dropping heads for communicating the at least one nozzle with the at least two dropping heads.

Preferably, the dropping device further includes at least one protective member arranged between the at least one nozzle and the at least two dropping heads for surrounding the at least one connecting pipe.

Preferably, the at least one protective member and the at least two dropping heads are respectively conical shaped, and a bottom side of the at least one protective member is tightly connected to a bottom side of each of the at least two dropping heads.

Preferably, the at least one protective member is opaque.

Preferably, the at least one connecting pipe is made of opaque material.

Preferably, an opaque layer is disposed on an outer surface of the at least one connecting pipe.

Preferably, each of the at least one connecting pipe is a straight pipe and the number of the connecting pipe is equal to that of the dropping heads.

Preferably, the number of the dropping heads is within a range from 2 to 4.

Preferably, the number of the nozzle is equal to that of the dropping heads.

Preferably, each of the at least two dropping heads is conical shaped, or one end of each of the at least two dropping heads corresponding to a substrate is conical shaped.

Preferably, a conical-shaped section of each of the at least two dropping heads has a minimum diameter d less than 0.5 mm.

Preferably, the dropping device further includes a pressure valve arranged between the at least one nozzle and the at least two dropping heads, and the number of the nozzle is equal to that of the dropping heads.

The present disclosure further provides another liquid crystal dropping device, including:

a container for containing liquid crystal and being provided with at least one nozzle on one end thereof for ejecting liquid crystal from the container;

a driver connected to the container for driving the liquid crystal to eject from the container through the at least one nozzle; and at least two dropping heads connected to the at least one nozzle.

Preferably, the number of the nozzle is equal to that of the dropping heads, and the at least one nozzle is respectively connected to the at least two dropping heads.

Preferably, the dropping device further includes at least one corrosion-resistant connecting pipe, the at least one connecting pipe respectively communicates the at least one nozzle with the at least two dropping heads.

Preferably, the at least one connecting pipe is made of opaque material, or an opaque layer is disposed on an outer surface of each of the at least one connecting pipe.

Preferably, the dropping device further includes at least one protective member arranged between the nozzle and the at least two dropping heads for surrounding the at least one connecting pipe.

Preferably, the at least one protective member is conical shaped, each of the at least two dropping heads is conical shaped, and a bottom side of the at least one protective member is tightly connected to a bottom side of each of the at least two dropping heads.

Preferably, each of the at least two dropping heads is conical shaped, or one end of each of the at least two dropping heads corresponding to a substrate is conical shaped.

Preferably, the dropping device further includes at least one pressure valve arranged between the at least one nozzle and the at least two dropping heads, and the number of the pressure valve is equal to that of the dropping heads.

In the present disclosure, the two dropping heads are connected to the nozzle to allow the liquid crystal contained in the container to eject from the container therethrough under driving force from the driver. The liquid crystal is dropped onto the substrate through the two dropping heads. Compared to the present dropping device provided with one dropping head, the dropping device of the present disclosure with one of the driver corresponding to two of the dropping heads is capable of shortening the time of manufacturing the liquid crystal panel, improving the efficiency of manufacturing the liquid crystal panel. Additionally, the dropping device of the present disclosure is capable of avoiding uneven arrangement of the liquid crystal for reducing the volume of each liquid crystal droplet ejected from the individual dropping head.

DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

Figure 1:
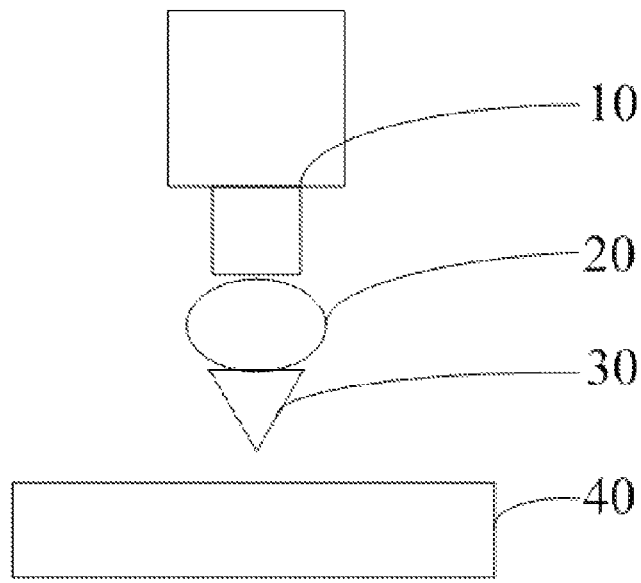
FIG. 1 is a schematic view of a present liquid crystal dropping device.
Figure 2:
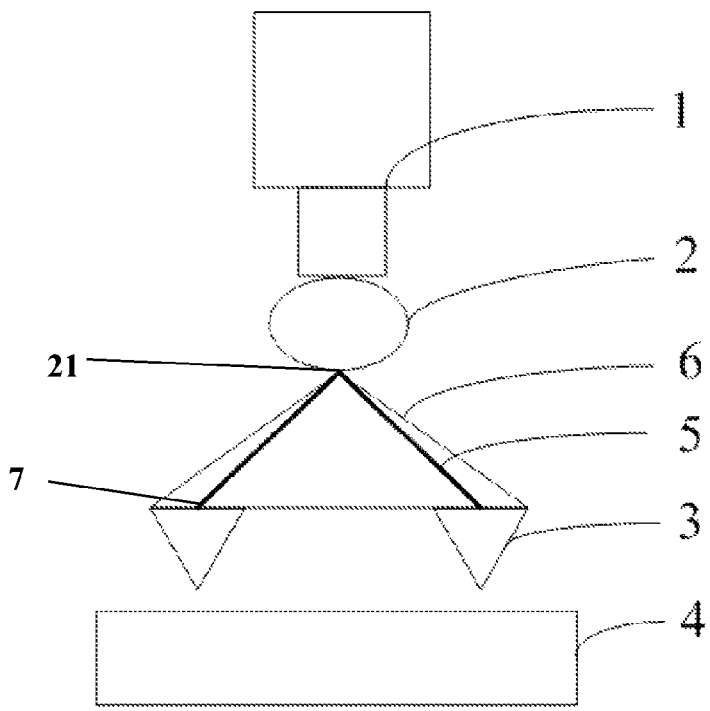
FIG. 2 is a schematic view of a liquid crystal dropping device in accordance with an embodiment of the present disclosure.

Referring to FIG. 2, which is a schematic view of a liquid crystal dropping device in accordance with an embodiment of the present disclosure. The dropping device includes a driver 1, a container 2, and two dropping heads 3. The container 2 is used for containing liquid crystal and is provided with a nozzle 21 on one end thereof for ejecting the liquid crystal. The driver 1 is used for supplying driving force for driving the liquid crystal to eject from the container 2 through the nozzle 21 thereof. The two dropping heads 3 are used for dropping the liquid crystal ejected from the nozzle 21 onto a substrate 4. The driver 1 is connected to the container 2 and the two dropping heads 3 are respectively connected to the nozzle 21 of the container 2.

Specifically, the container 2 includes the nozzle 21 with the two dropping heads 3 connected thereto, thus, the two dropping heads 3 are capable of spitting the liquid crystal ejected from the nozzle 21. In this way, the volume of each liquid crystal droplet ejected from the corresponding individual dropping head can be reduced. It is noted that in other embodiments, the number of the nozzle 21 can be adjusted to be equal to that of the dropping head 3, for example, the container 2 can be provided with two of the nozzles 21 respectively corresponding to the two dropping heads 3. Since the driving force supplied from the driver 1 substantially remains unchanged, therefore, compared to the volume of each liquid crystal droplet ejected from the present dropping device which includes only one of the dropping head 3, the volume of each liquid crystal droplet ejected from the individual dropping head 3 of the dropping device of the present disclosure is relatively smaller.

In the present disclosure, the two dropping heads 3 are connected to the nozzle 21 to allow the liquid crystal contained in the container 2 to eject from the container 2 therethrough under driving force from the driver 1. The liquid crystal is dropped onto the substrate 4 through the two dropping heads 3. Compared to the present dropping device provided with one dropping head, the dropping device of the present disclosure with one driver 1 corresponding to two dropping heads 3 is capable of shortening the time of manufacturing the liquid crystal panel so as to improve the efficiency of manufacturing the liquid crystal panel. Additionally, the dropping device of the present disclosure is capable of avoiding uneven arrangement of the liquid crystal on the substrate due to reduce the volume of each liquid crystal droplet ejected from the individual dropping head 3.

According to the driving force supplied from the driver 1 and the volume of each liquid crystal droplet ejected from the individual dropping head 3, the number of the dropping head 3 can be accordingly adjusted. Preferably, the number of the dropping head 3 is within a range from 2 to 4. For example, when the driver 1 is a pump, the number of the dropping head 3 can be at most 4 according to the pressure increment of the pump. In other embodiments, the pressure increment of the pump can be correspondingly adjusted.

Furthermore, the dropping device of the present disclosure further includes a connecting pipe 5 arranged between the nozzle 21 of the container 2 and the two dropping heads 3 for communicating the nozzle 21 with the dropping heads 3. The connecting pipe 5 is made of corrosion-resistant material. In the embodiment which the container 2 of the dropping device is provided with one nozzle 21, the connecting pipe 5 can be used for spitting or guiding the liquid crystal flowed to the nozzle. In the embodiment which the number of the nozzle 21 of the container 2 is equal to that of the dropping head 3, the connecting pipe 5 is used for guiding the liquid crystal flowed to the nozzle 21.

Due to the property of the liquid crystal, the connecting pipe 5 is preferably made of opaque material. In other embodiments, the connecting pipe 5 can be made of transparent material. In this situation where the connecting pipe 5 is made of transparent material, the dropping device may further include an opaque layer coated on an outer surface of the connecting pipe 5 or include at least one protective member 6 arranged between the nozzle 21 of the container 2 and the two dropping heads 3 for surrounding the connecting pipe 5. The protective member 6 can in addition protect the connecting pipe 5 from being affected by outer force or being polluted by external environment. Preferably, the protective member 6 can be shaped like a cone with a bottom side tightly connected to a top side of each conical configured dropping head 3.

Specifically, the connecting pipe 5 includes a main pipe and at least one branch pipe integrally formed with the main pipe. One end the branch pipe is connected to one end of the main pipe. The number of the branch pipe is equal to that of the dropping head 3. The other end of the main pipe is connected to the nozzle 21 of the container 2 and the other end of each branch pipe is connected to the corresponding dropping head 3. In order to reduce the resistance from the side wall of the connecting pipe against the liquid crystal passing through the connecting pipe, the connecting pipe may be preferably a straight pipe and the number of the connecting pipe is equal to that of the dropping head 3.

In order to guarantee continuous liquid crystal droplet from the dropping heads 3, in the embodiment, each dropping head 3 is substantially shaped like a cone or is configured with one end thereof connected to the substrate 4 shaped like a cone. In order to reduce the volume of each liquid crystal droplet from the individual dropping head 3, the conical-shaped section of each dropping head 3 preferably has a minimum diameter d less than 0.5 mm.

In order to further reduce the volume of each liquid crystal droplet from the individual dropping head 3, the nozzle 21 is preferably conical shaped and has a diameter d less than 0.5 mm.

Specifically, the dropping device further includes at least one pressure valve 7 located between the connecting pipe 5 and the dropping heads 3. The number of the pressure valve 7 is equal to that of the dropping head 3. The volume of each liquid crystal droplet can be adjusted according to the opened degree of the valve 7, and the arrangement of the liquid crystal and the distance between two adjacent liquid crystal droplets can be adjusted by controlling on and off of the pressure valve 7.

Even though information and the advantages of the present embodiments have been set forth in the foregoing description, together with details of the mechanisms and functions of the present embodiments, the disclosure is illustrative only; and that changes may be made in detail, especially in matters of shape, size, and arrangement of parts within the principles of the present embodiments to the full extend indicated by the broad general meaning of the terms in which the appended claims are expressed.

What is claimed is:

1. A liquid crystal dropping device, comprising:
    a container for containing liquid crystal and being provided with at least one nozzle on an end thereof for ejecting liquid crystal from the container;
    a driver connected to the container for driving the liquid crystal to eject from the container;
    at least two dropping heads connected to the at least one nozzle;
    at least one corrosion-resistant connecting pipe arranged between the at least one nozzle and the at least two dropping heads for communicating the at least one nozzle with the at least two dropping heads; and
    at least one protective member arranged between the at least one nozzle and the at least two dropping heads for surrounding the at least one connecting pipe;
    wherein, the at least one protective member and the at least two dropping heads are respectively conical shaped, and a bottom side of each of the at least one protective member is tightly connected to a top side of each of the at least two dropping heads.

2. The dropping device as claimed in claim 1, wherein the at least one protective member is opaque.

3. The dropping device as claimed in claim 1, wherein the at least one connecting pipe is made of opaque material.

4. The dropping device as claimed in claim 1, wherein an opaque layer is disposed on an outer surface of the at least one connecting pipe.

5. The dropping device as claimed in claim 1, wherein each of the at least one connecting pipe is a straight pipe and the number of the connecting pipe is equal to that of the dropping heads.

6. The dropping device as claimed in claim 1, wherein the number of the dropping heads is within a range from 2 to 4.

7. The dropping device as claimed in claim 6, wherein the number of the nozzle is equal to that of the dropping heads.

8. The dropping device as claimed in claim 1, wherein each of the at least two dropping heads is conical shaped, or one end of each of the at least two dropping heads corresponding to a substrate is conical shaped.

9. The dropping device as claimed in claim 8, wherein a conical-shaped section of each of the at least two dropping heads has a minimum diameter d less than 0.5 mm.

10. The dropping device as claimed in claim 1 further comprising a pressure valve arranged between the at least one nozzle and the at least two dropping heads, and the number of the nozzle is equal to that of the dropping heads.

11. A liquid crystal dropping device, comprising:
    a container for containing liquid crystal and being provided with at least one nozzle on one end thereof for ejecting liquid crystal from the container;
    a driver connected to the container for driving the liquid crystal to eject from the container through the at least one nozzle;
    at least two dropping heads connected to the at least one nozzle;
    at least one corrosion-resistant connecting pipe, the at least one connecting pipe respectively communicates the at least one nozzle with the at least two dropping heads; and
    at least one protective member arranged between the nozzle and the at least two dropping heads for surrounding the at least one connecting pipe;
    wherein the at least one connecting pipe is made of opaque material, or an opaque layer is disposed on an outer surface of each of the at least one connecting pipe; the at least one protective member is conical shaped, each of the at least two dropping heads is conical shaped, and a bottom side of each of the at least one protective member is tightly connected to a top side of each of the at least two dropping heads.

12. The dropping device as claimed in claim 11, wherein the number of the nozzle is equal to that of the dropping heads, and the at least one nozzle is respectively connected to the at least two dropping heads.

13. The dropping device as claimed in claim 11, wherein each of the at least two dropping heads is conical shaped, or one end of each of the at least two dropping heads corresponding to a substrate is conical shaped.

14. The dropping device as claimed in claim 11 further comprising at least one pressure valve arranged between the at least one nozzle and the at least two dropping heads, and the number of the pressure valve is equal to that of the dropping heads.

* * * * *